United States Patent [19]
Perlo et al.

[11] Patent Number: 5,841,596
[45] Date of Patent: Nov. 24, 1998

[54] LIGHTING SYSTEM WITH A MICRO-TELESCOPE INTEGRATED IN A TRANSPARENT PLATE

[75] Inventors: Piero Perlo, Sommariva Bosco; Luca Sardi, Sant'Ambrogio; Sabino Sinesi, Piossasco, all of Italy

[73] Assignee: C.R.F. Societa' Consortile per Azioni, Torino, Italy

[21] Appl. No.: 719,547

[22] Filed: Sep. 25, 1996

[30] Foreign Application Priority Data

Sep. 26, 1995 [IT] Italy .................. TO95A0765
Sep. 26, 1995 [IT] Italy .................. TO95A0766

[51] Int. Cl.[6] .................. G02B 17/06; F21V 7/04
[52] U.S. Cl. .................. 359/859; 359/732; 359/839; 362/347
[58] Field of Search .................. 359/731, 732, 359/859, 858, 641; 362/259, 350, 347, 800

[56] References Cited

U.S. PATENT DOCUMENTS

| | | |
|---|---|---|
| 3,536,908 | 10/1970 | Oster .................. 385/901 |
| 3,763,372 | 10/1973 | Fedotowsky et al. . |
| 3,814,504 | 6/1974 | Brady et al. .................. 359/727 |
| 4,013,915 | 3/1977 | Dufft .................. 359/619 |
| 4,712,885 | 12/1987 | Dawson et al. .................. 359/728 |
| 4,770,514 | 9/1988 | Silverglate .................. 359/728 |
| 4,792,685 | 12/1988 | Yamakawa .................. 359/859 |
| 4,835,380 | 5/1989 | Opheij et al. .................. 359/731 |
| 5,698,941 | 12/1997 | Jaskie et al. .................. 362/298 |

FOREIGN PATENT DOCUMENTS

| | | |
|---|---|---|
| 3033377 | 4/1981 | Germany . |
| 3504366 | 8/1985 | Germany . |
| 0426248 | 5/1991 | Japan . |
| 0467303 | 7/1991 | Japan . |
| 0582958 | 2/1994 | Japan . |

*Primary Examiner*—Jon W. Henry
*Attorney, Agent, or Firm*—Sughrue, Mion, Zinn, Macpeak & Seas, PLLC

[57] ABSTRACT

The light radiation beam emitted by a source of finite dimension, integrated in a transparent plate or in contact therewith, is initially reflected inside the plate by a first surface located on the side of the plate (3) which is more remote from the source. The reflected light rays pass through plate and are again reflected by a second surface having micro projections and then directed outwardly, according to a micro-telescope arrangement.

13 Claims, 10 Drawing Sheets

LIGHTING SYSTEM WITH A MICRO-TELESCOPE INTEGRATED IN A TRANSPARENT PLATE

BACKGROUND OF THE INVENTION

The present invention relates to the field of lighting systems, such as outer and inner lighting systems for motor vehicles, lighting systems for buildings, lighting systems for safety signals and road or railway signals, as well as lighting systems for scientific apparatus, laser processes, test or inspection apparatus, measurement systems for velocimeters, reading or writing systems of the compact disk type, radar sensors for recognizing obstacles or the shape of objects, optical scanning systems, display lighting systems or warning lights.

The correction of vergence of light beams, particularly those emitted by solid state light sources such as LED or lasers, is usually associated with two main requirements: the reduction of the thickness, i.e. the dimension along the optical axis, of the overall optical system and uniformity of the light beam coming out of the system.

In a lighting system, the use of a source or matrix of sources without using lenses is not accepted since it does not satisfy the requirement for uniformity of the light beam through the whole emitting surface. In a conventional system such as that diagrammatically shown in FIG. 1 of the annexed drawings, the divergence of a LED light source 1 is controlled by a lens system 2 aligned on the axis of source 1. Once the diameter of lens 2 is chosen, the thickness of the source-lens system is determined by the divergence of light beam 3 emitted from source 1.

If source 1 emits a very divergent light beam (FIG. 2), the thickness can be partially reduced. However this is achieved to the detriment for the system efficiency. Indeed, in this case beam 3 reaches the first interface of lens 2 at a high incidence angle and therefore is partially reflected backwardly as shown at 4. Moreover, in order that the lens may act efficiently on the beam vergence it is necessary that it has highly curved surfaces. Thus, the lens volume and complexity of manufacture increase.

A further problem associated with this solution is the assembling of the system. It is in fact necessary to provide a casing which keeps source 1 and lens 2 spaced apart from, and aligned with each other. This implies a further increase in the weight and complexity of the system.

More compact and efficient solutions (see annexed FIG. 20) are possible by using lenses whose first interface is formed by projections which operate on the basis of the total inner reflection concept described for example in "Compact dielectric reflective element. I.Half-sphere concentrators of radially emitted light", di Janis Spigulis "Applied optics, volume 33 n. 25—1994 —pages 5970–5974 and USSR patents 1.227.909 of Jul. 4, 1984 and 1.282.051 of Jan. 5, 1985. For this type of lenses there is still the problem of supporting the source; the control of uniformity of the beam is very critical and the efficiency is bound to the losses due to Fresnel reflections at the interfaces. Furthermore, the solution is not able to act as a radiation receiver. There is also a high reduction of efficiency when square or generally rectangular cross-sections of the beam coming out of the device must be obtained. A similar solution based also on the total inner reflection (TIR) concept is described in U.S. Pat. No. 4,337,759 assigned to Physical Optics Corporation. The principle of operation of this solution is shown in FIG. 21.

FIG. 22 shows another known solution with integrated optical guide, used for example in compact disk readers. This solution is very complicated technologically and does not allow for any flexibility in defining the features of the beam. The most advanced micro technologies must be used in order to deposit the layer which acts as wave guide, for generating projections having a dimension lower than the wavelength, for the beam outlet and it is also difficult to generate beams with a large initial diameter or with a predefined shape. Furthermore, suitable materials are required.

SUMMARY OF THE INVENTION

The object of the present invention is that of overcoming said drawbacks. Another particular object of the invention is that of achieving an actual efficiency in transmitting the light beam greater than 85%, with a compact solution having a thickness lower than 5 mm, a uniform collimated or vergent light beam at the outlet, with a circular cross-section or a shape of large diameter.

In view of achieving these objects, the present invention provides a lighting system having a transparent plate, and a light source arranged immediately adjacent to a face of the transparent plate or incorporated into the latter, said plate having a pair of reflective or semi-reflective surfaces on its opposite faces, according to a micro-telescope arrangement, so as to generate an expanded light beam with predetermined configuration and features going out of the surface of the transparent plate which is remote with respect to the light source.

BRIEF DESCRIPTION OF THE DRAWINGS

The invention will be now described with reference to the annexed drawings, given purely by way of non limiting example, in which.

DETAILED DESCRIPTION OF THE INVENTION

According to the invention, the vergence of the light beam emitted by a source of finite dimension is varied by means of an optical system with a micro-telescope integrated into a transparent plate.

Figure 1:
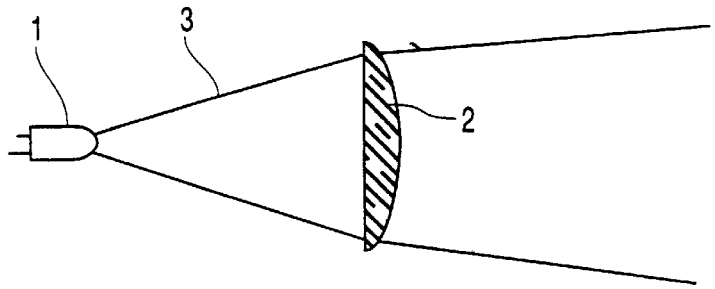
FIG. 1 is a diagrammatic view of a conventional lighting system, including a solid state source of the LED or laser type.
Figure 2:
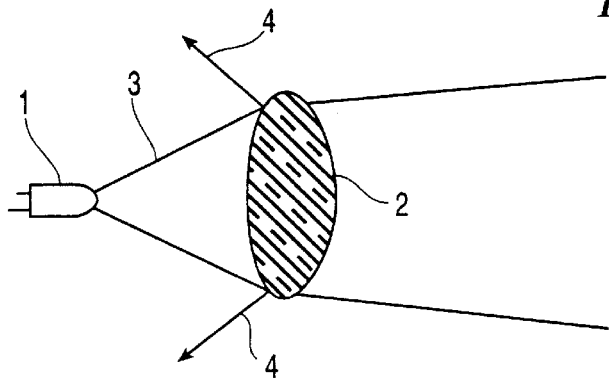
FIG. 2 shows a further known system having a source having a very divergent light beam and a highly curved lens.
Figure 3:
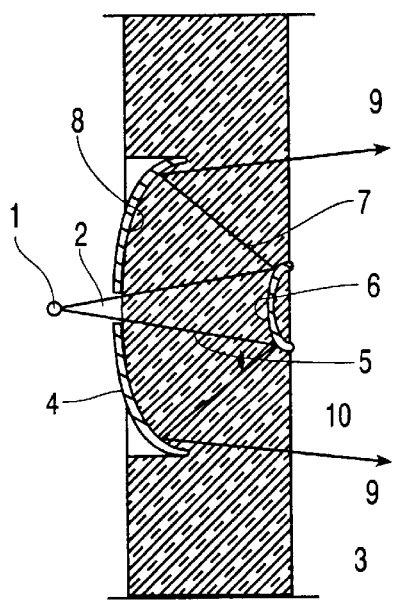
FIG. 3 is a cross-sectional view of a first embodiment of the optical system according to the invention.

With reference to FIG. 3, a light source 1 emits a beam of light rays 2, whose divergence depends upon the construction of the source itself. The rays are emitted towards a transparent plate 3, formed of a plastic or glass material, where they reach a first interface 4 on which they are subject to partial reflection and refraction. The refracted rays 5 reach a first reflecting convex surface 6 (located on the face of plate 3 which is remote from the source) which reflects the rays towards a second reflecting concave surface 8, located on the face of plate 3 which is closer to source 1, which corrects the vergence of beam 7 into a predetermined direction. Plate 3 acts as a light guide provided with an integrated micro-telescope. The analytical expression of the two reflecting surfaces 6, 8 is determined as a function of the features of the beam emitted from source 1, the material forming plate 3 and the features that the beam coming out of plate 3 must have. In its more developed configuration, the system is provided with a focal power at its second interface 9, i.e. the light beam is again varied in its distribution and vergence. The reflecting surfaces 6, 8 are obtained, in a way known per se, by applying a layer of suitable material on the surface of plate 3.

Figure 4:
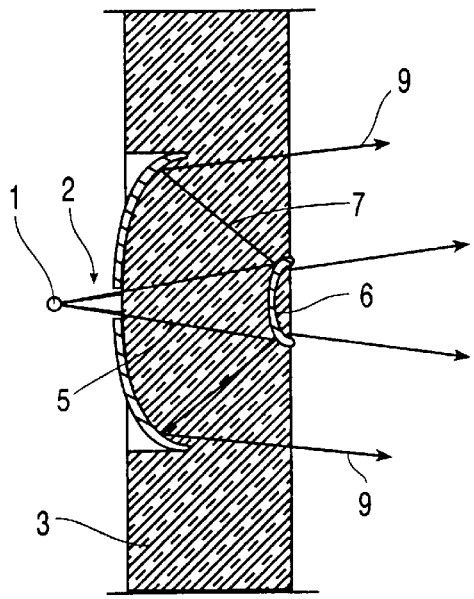
FIG. 4 shows a variant of FIG. 3.

A variant of the solution of FIG. 3 is shown in FIG. 4, where the first reflecting surface 6 has the same configuration as that in FIG. 3, but is coated with a semi-transparent layer. In this manner, a viewer sees the device with no dark areas. The second interface thus emits a uniform light beam throughout its surface.

Figure 5:
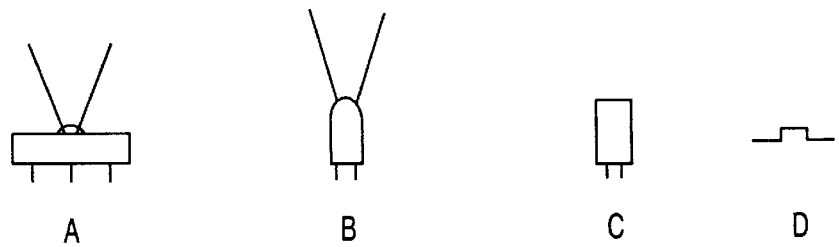
FIG. 5 shows various typical configurations of LED light sources.

FIG. 5 shows some typical embodiments of LED light sources which can be used in the device according to the invention, the use of further embodiments being obviously not excluded. In the so-called "spider" configuration of FIG. 5A, a small lens has the function of correcting the light beam. In the cylindrical configuration of FIG. 5B, the LED has a higher dimension and the cylinder ends with an upper lens. In the case of FIG. 5C the cylindrical LED is deprived of the upper lens which is replaced by a coated reflecting layer. In FIG. 5D, the diode is not provided with a lens for correcting the divergence of the beam.

Figure 6A:
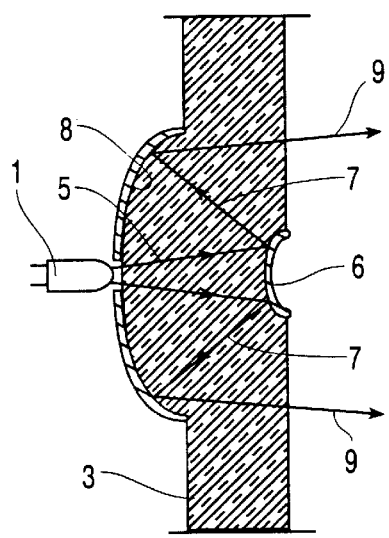
FIG. 6A shows a further embodiment of the invention.
Figure 6B:
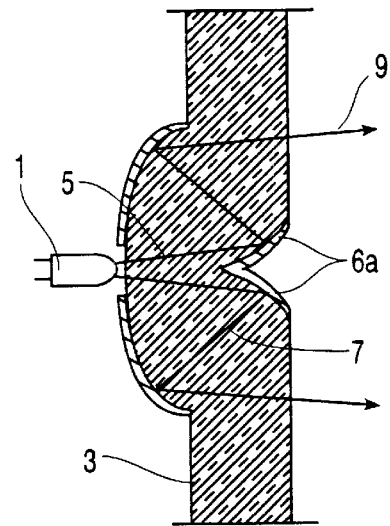
FIG. 6B shows a variant of FIG. 6A.

FIG. 6A shows a solution in which the LED is almost in contact with plate 3. FIG. 6B shows a variant in which the first reflecting convex surface 6 is replaced by two reflecting concave surfaces 6a defining a V-shaped profile.

Figure 7:
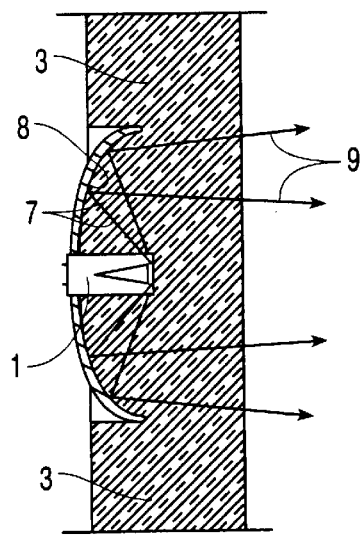
FIG. 7 shows yet a further embodiment of the invention.

FIG. 7 shows a further embodiment in which the LED is integrated directly into plate 3. In this case the planar mirror of the LED acts as the first mirror of the telescope. The LED can be glued to the plate for example by an adhesive of polymeric type. The reflecting layer may be coated directly onto the plate.

Figure 8:
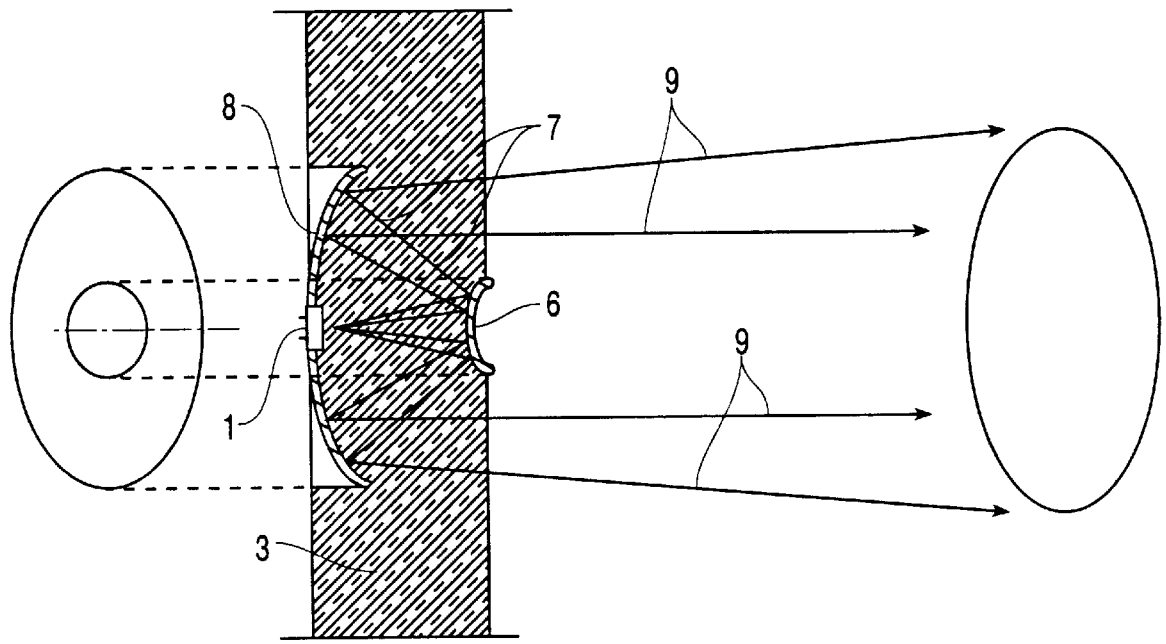
FIGS. 8,9 show two further variants which generate a beam having a circular and a rectangular cross-section respectively.

In the solution of FIG. 8, the LED source is integrated into the plate and the circular cross-section of the beam emitted out of the telescope is obtained by circular mirrors.

Figure 9:
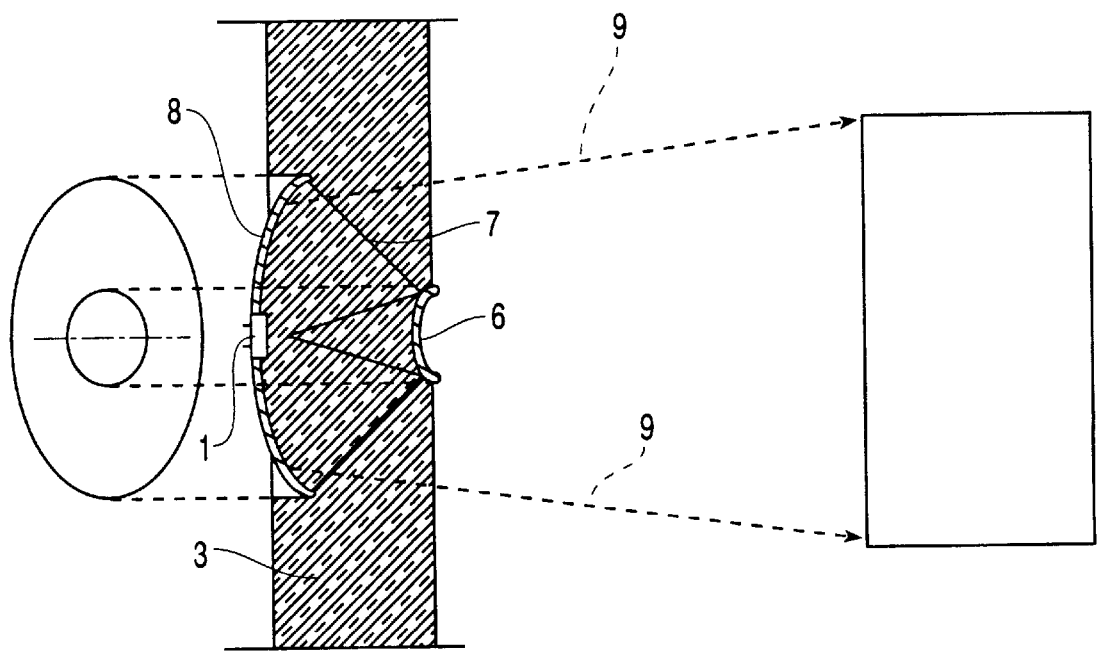

In FIG. 9, the rectangular cross-section of the beam is obtained by choosing an analytic aspheric shape for the second mirror 8 with circular cross-section. Another method to generate specific shapes of the emitted beam is that of using diffractive surfaces in lieu of one of the two mirrors. A further method for shaping the beam is that of using a shaped cross-section for one of the two mirrors. This configuration is less efficient, but can be manufactured more easily with respect to the solution of the complex aspheric surface. Similarly, beams having various other types of cross-section, such as hexagonal, elliptical or star-shaped cross-section, may be obtained.

Figure 10:
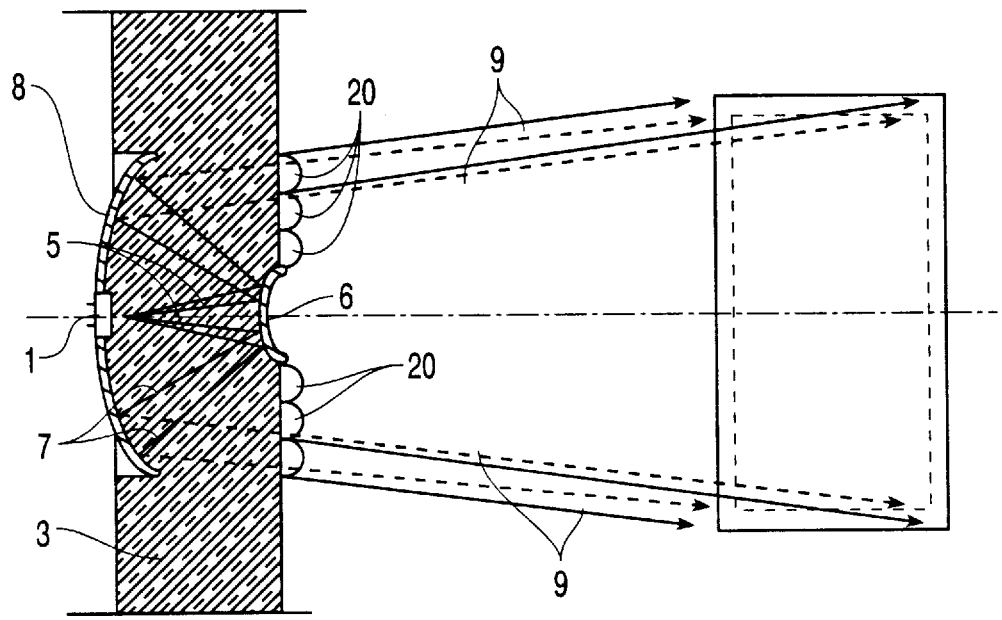
FIG. 10 shows a further embodiment of the invention having refractive or diffractive or diffractive-refractive hybrid lenses, adapted to generate two or more light beams at predetermined angles.

In FIG. 10 the outer surface of the transparent plate 3 is provided for example with refractive, or diffractive, or refractive-diffractive hybrid lenses 20, to generate two or more light beams at predetermined angles.

Figure 11:
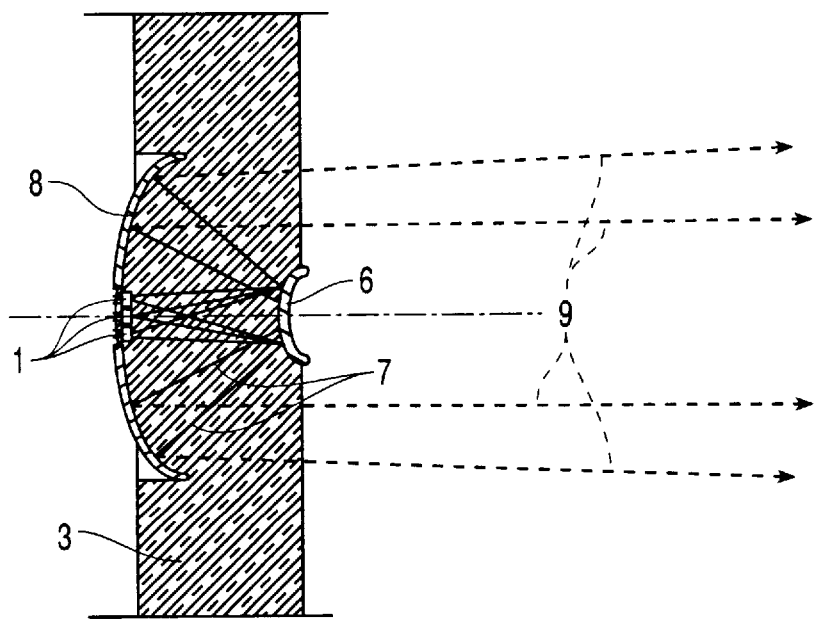
FIG. 11 shows a further embodiment using a polychromatic source formed by a single source or various separate adjacent sources.

In FIG. 11 the micro-telescope is used with a polychromatic beam emitted by a single source or various separate adjacent sources designated by 1.

Figure 12:
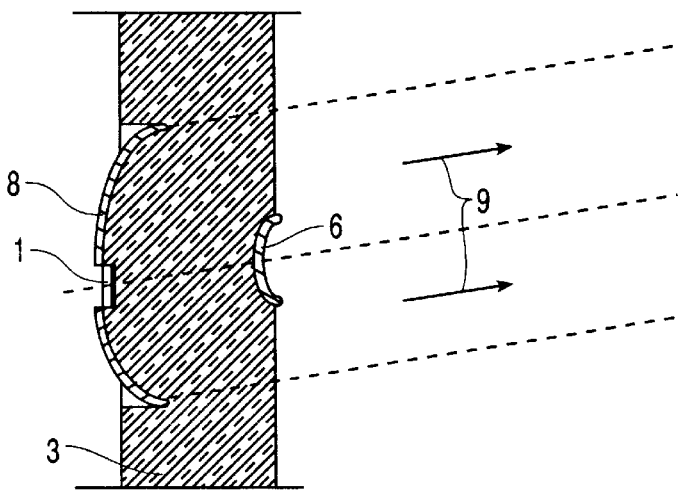
FIG. 12 shows a further embodiment with the axis of the system being inclined with respect to a direction orthogonal to the plate.

FIG. 12 shows a configuration with the telescope axis inclined with respect to a direction orthogonal to the plate.

Figures 13A, 13B:
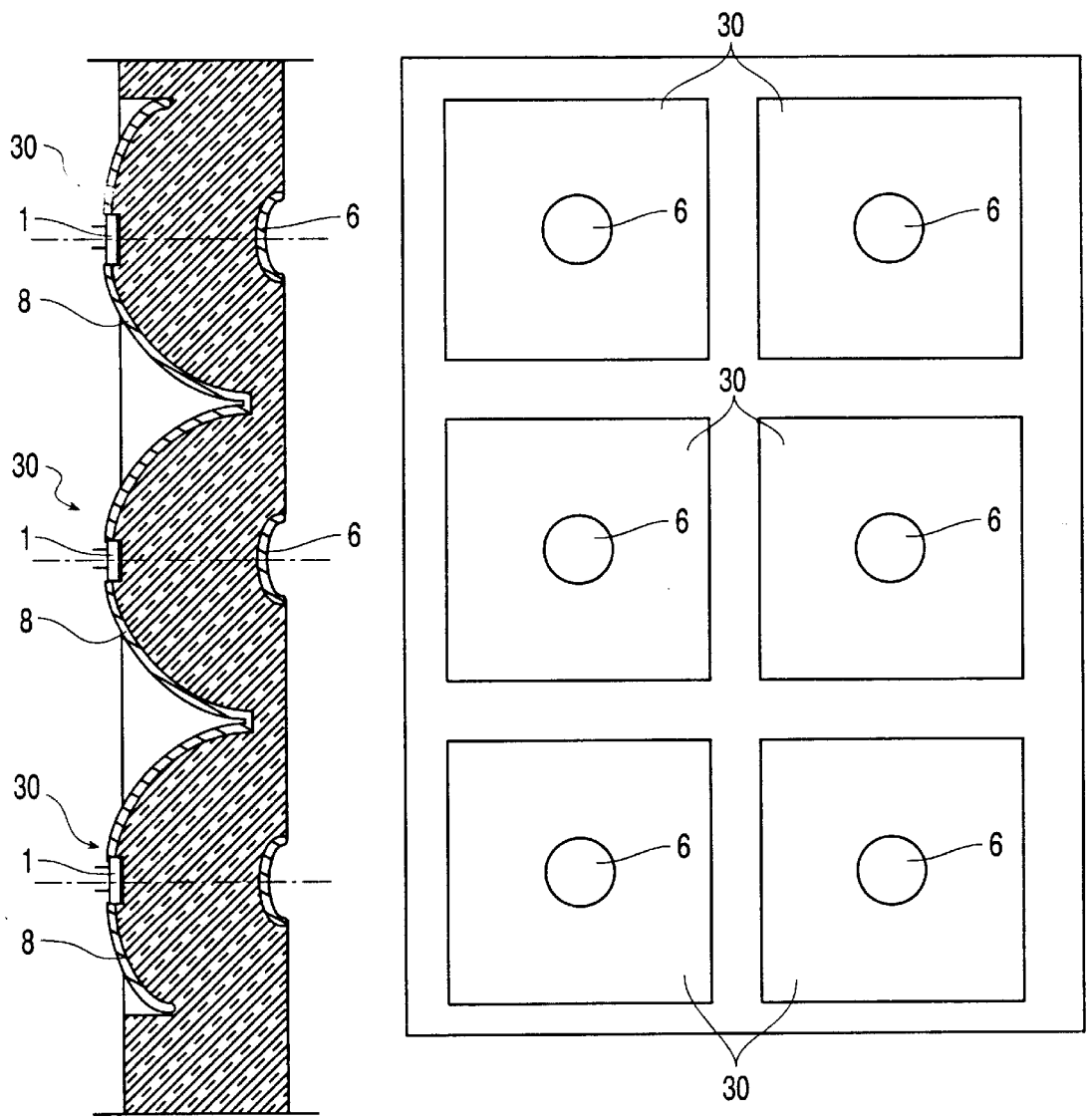
FIGS. 13A,13B show a cross-sectional view and a front view of a further solution including a matrix of micro-telescopes.

In FIGS. 13A, 13B there is shown a matrix of telescopes which cover an extended surface, such as that one may have in a lighting system for safety signals, in a side or central light for a motor vehicle, in an inner lighting system for a motor vehicle, in a road signal, in a traffic light, in a railway signal, in a lighting system for a building or an industrial plant, in scientific apparatus, in inspection systems, in laser processes, in measurement systems such as velocimeters.

The matrix may be formed of elements which are different from each other, i.e. in which the beams are generated with different vergence or shape. In order to provide the various embodiments, the typical technologies which are applied in micro machining operations are necessary. The matrix may be manufactured by conventional machining operations or by turning with a diamond point, with conventional optical or lithographic techniques or high resolution lithographic techniques for providing structured surfaces below wavelength, by laser writing techniques, by indirect engraving, evaporation or ablation techniques. The reproduction may be performed by conventional methods such as drawing, plate pressing or compression-injection techniques. The material may be plastic material or polymeric material or also glass material, but generally no specific materials are necessary for working out the solution.

Figure 14:
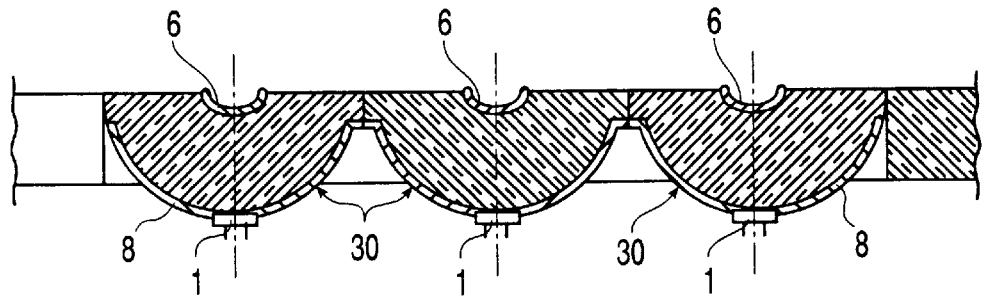
FIG. 14 is a cross-sectional view of a variant of the micro-telescope matrix shown in FIG. 13.

FIG. 14 shows a solution in which a matrix of micro-telescopes 30 is formed by elements which are separate from each other, to provide plate 3 with a flexibility sufficient for being adapted to the shape of a support surface.

Figure 15:
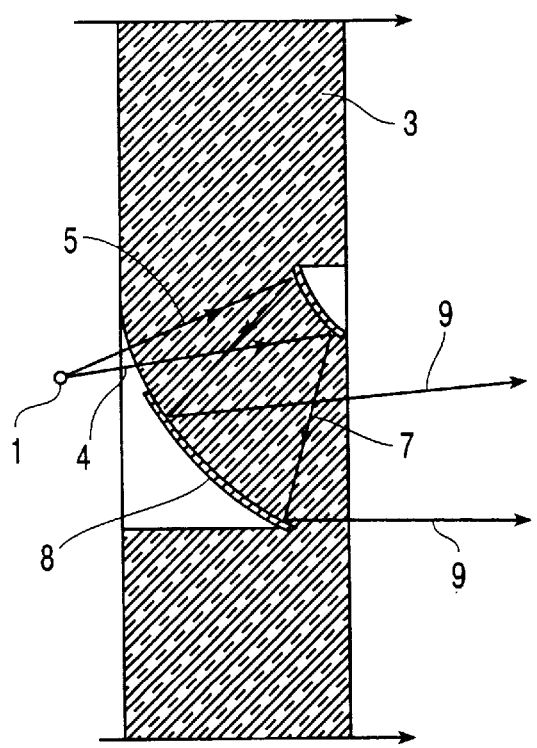
FIG. 15 shows a further embodiment of the invention with an out-of-axis micro-telescope and totally reflecting mirrors.

FIG. 15 shows a variant of the device according to the invention which has an asymmetrical configuration, in lieu of the symmetrical configuration shown in the previous figures. Even in this case one may have a solution (not shown) in which the reflecting surface 6 is semi-transparent, as provided in FIG. 4.

Figure 16:
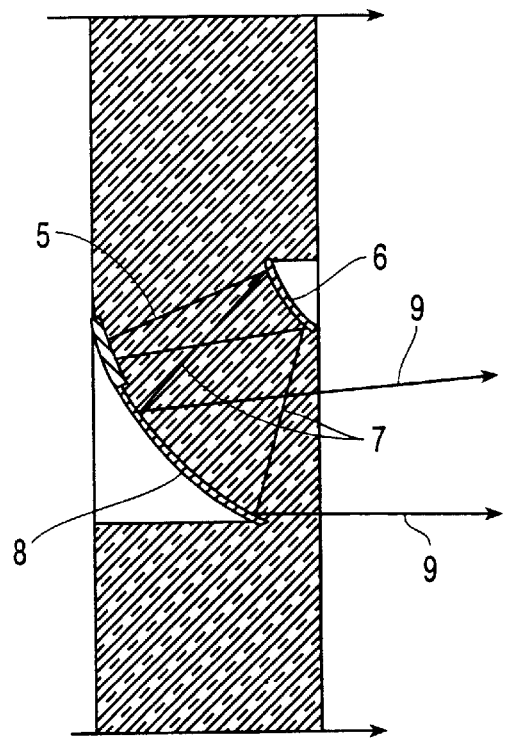
FIG. 16 shows a solution with a LED integrated into the plate and generating a beam of circular cross-section.

FIG. 16 shows the solution with a source integrated into the plate as in the case of FIG. 7, applied to the asymmetrical arrangement of FIG. 15.

Even in case of an asymmetrical arrangement, solutions are possible (not shown) adapted to obtain an emitted beam having a circular or rectangular cross-section, similarly to what has been shown in FIGS. 8, 9. Similarly, it is possible also to obtain emitted beams having other types of cross-section, such as hexagonal, elliptical or star-shaped cross-section.

Figure 17:
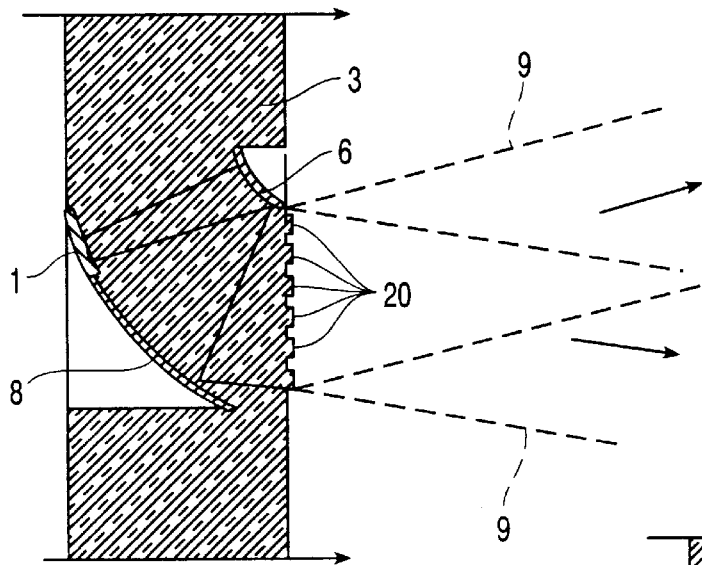
FIG. 17 shows a solution including refractive or diffractive or refractive-diffractive hybrid lenses, adapted to shape the light beam.

In FIG. 17, the outer surface of the transparent plate 3 has refractive or diffractive or refractive-diffractive hybrid lenses 20, similarly to what has been shown in FIG. 10, to generate two or more light beams at predetermined angles. These microlenses 20 may be directly integrated into the plate or may be integrated in a film glued to the plate.

Figure 18:
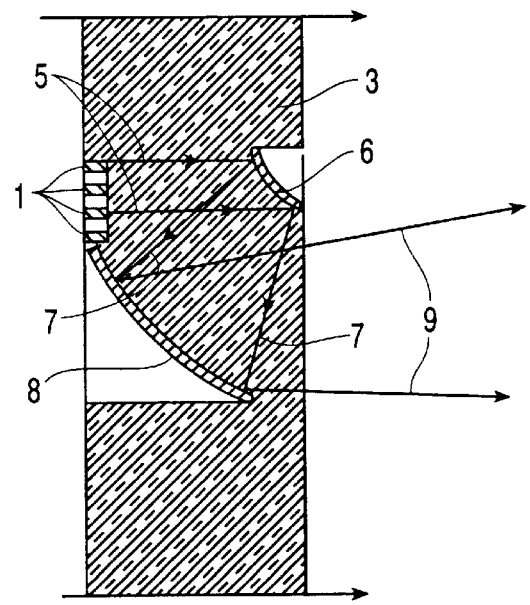
FIG. 18 shows a polychromatic source formed by a single source or various separate adjacent sources.

FIG. 18 shows the solution with a polychromatic beam emitted by a single source or by various separate adjacent sources.

Figure 19:
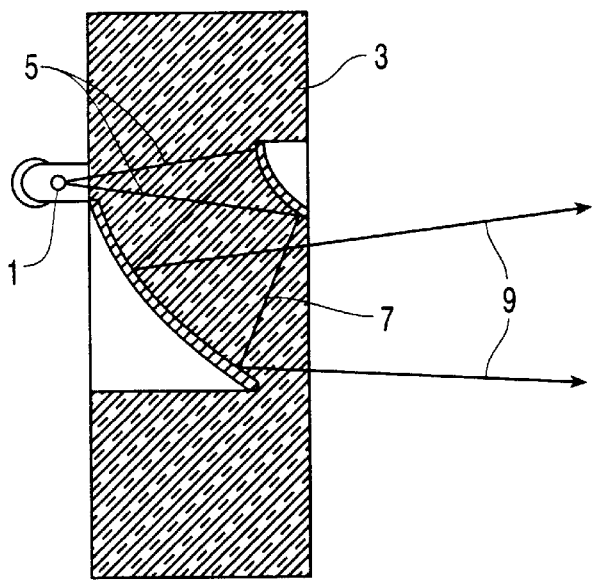
FIG. 19 shows a configuration with a source outside the plate and provided with a mirror which addresses part of the radiation into the plate.
Figure 20:
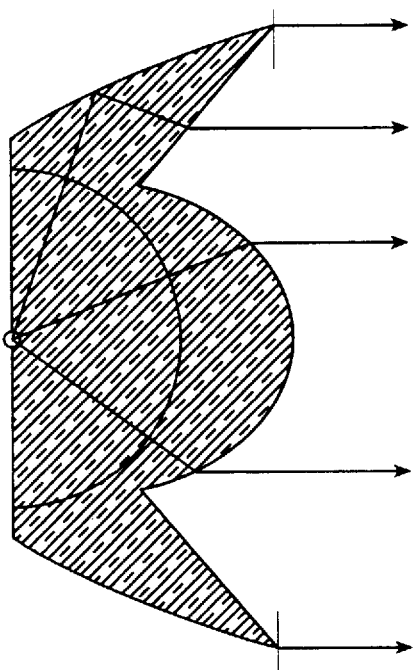
FIG. 20 shows a total internal reflection lens according to the prior art.
Figure 21:
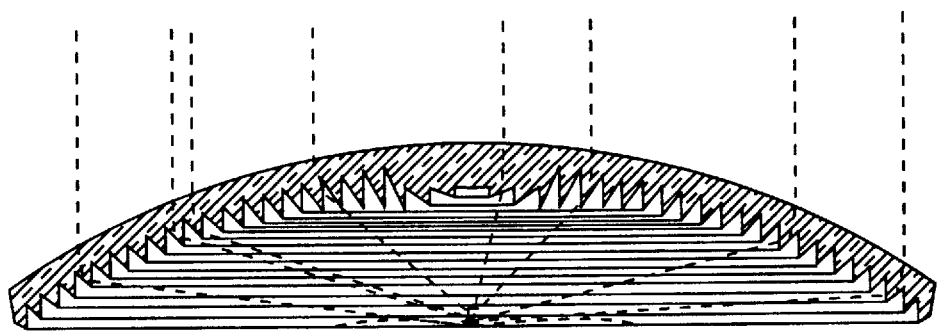
FIG. 21 shows a further solution of a total internal reflection lens, according to the prior art.
Figure 22:
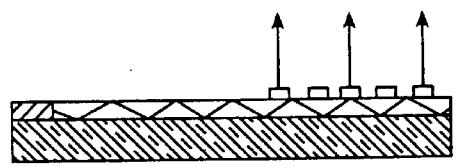
FIG. 22 shows an integrated wave guide system according to the prior art, used for compact disks.

FIG. 19 shows a solution in which the source is outside the plate and is provided with a mirror which contributes to address a part of the radiation towards the plate.

A further solution may be provided (not shown) with the telescope axis inclined with respect to a direction orthogonal to the plate, similarly to what has been illustrated in FIG. 12, and a solution with a matrix of telescopes (also not shown), similarly to what has been shown in FIGS. 13, 14 may also be used.

Figure 23:
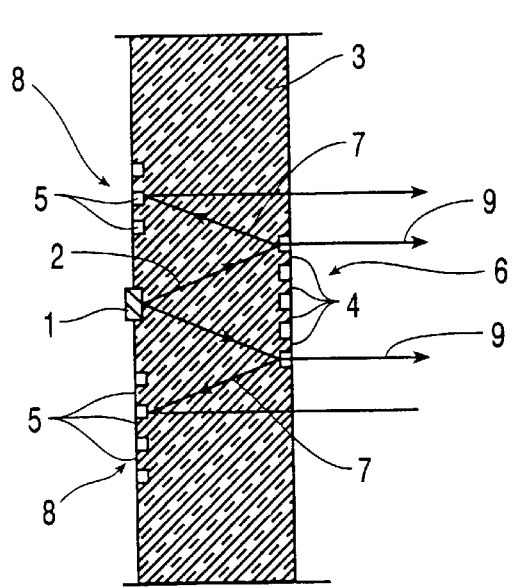
FIG. 23 shows a micro-telescope system according to another embodiment of the invention, with microprojections integrated in a plate.

With reference to FIG. 23, a light source 1 emits a beam of light rays 2 whose divergence depends upon the construction of the source. Source 1 is integrated in a transparent plate 3, formed of a plastic or glass material. The light rays 2 reach a first surface 6 (located on the face of the plate 3 which is remote with respect to the source) having micro projections 4, which partially transmit the beam while varying the vergence thereof and partially reflect the beam towards a second surface 8, located on the face of the plate 3 which is closer to source 1, the surface 8 also having micro projections 5 formed in plate 3, which reflect the beam 7 outwardly of the plate, generating a beam 9. Plate 3 acts as a light guide provided with an integrated micro-telescope. The analytical expression of the two micro projection surfaces 6, 8 is determined as a function of the features of the beam emitted by source 1, the material forming plate 3 and the features which the beam coming out of plate must have.

Figure 25:
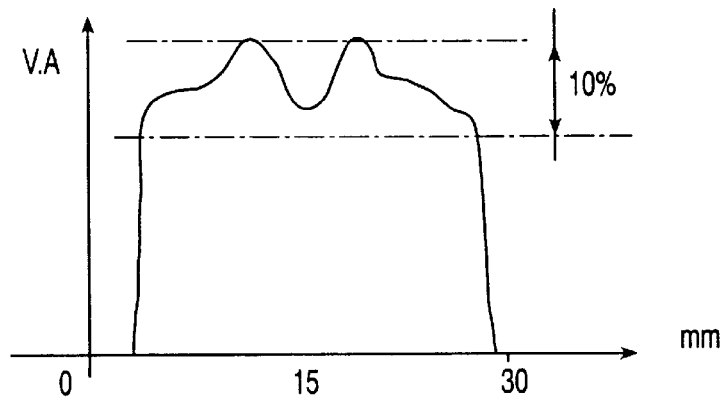
FIG. 25 shows a diagram which gives the variation of the beam intensity at the output of the device according to the invention as a function of the distance from the optical axis, with reference to an embodiment with a diameter of 30 mm and thickness of 5 mm with a LED source with dominant wavelength of 590 Nm.

Micro projections 5 on the interface on the side of source 1 may be covered with a reflective coating. By way of example, the measured efficiency of the light of a LED source (wavelength=590 Nm) totally transmitted by a system with a 5 mm thickness and a 30 mm diameter into a collimated beam is greater than 90%, the variation of intensity in the beam coming out of the device being restricted within 10% (see FIG. 25). Typical values of the efficiency also with beams having a complicated shape are greater than 75%.

In its more complicated configuration, the system at the interface at the output of the beam is provided with focal power, the light beam being again varied in its distribution and vergence by means of micro projections.

Figure 24:
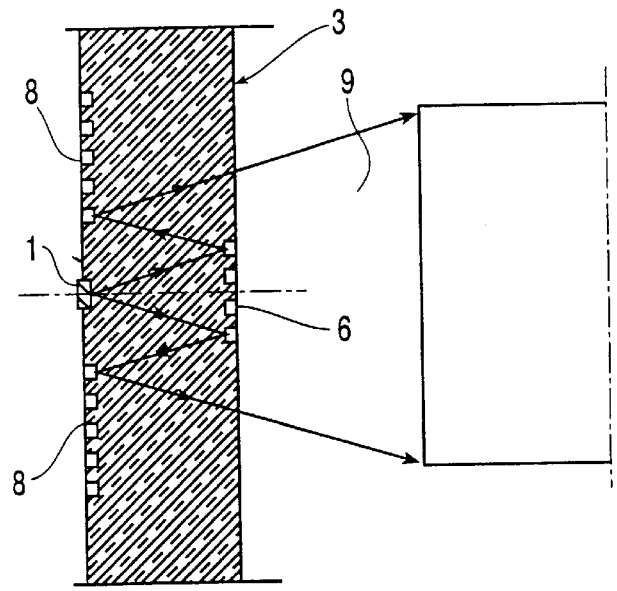
FIG. 24 shows a variant of FIG. 23 in which the micro projections located on the side of the plate which is closer to the source are shaped so as to generate a beam of rectangular cross-section at the output.

In the solution of FIG. 24, the beam 9 at the output is obtained with a rectangular cross-section, by means of an analytical discretized micro projection surface 8 located on the side of source 1. By this configuration the whole light is used with the maximum efficiency without necessarily cutting the output of a beam having a circular cross-section.

Figure 26:
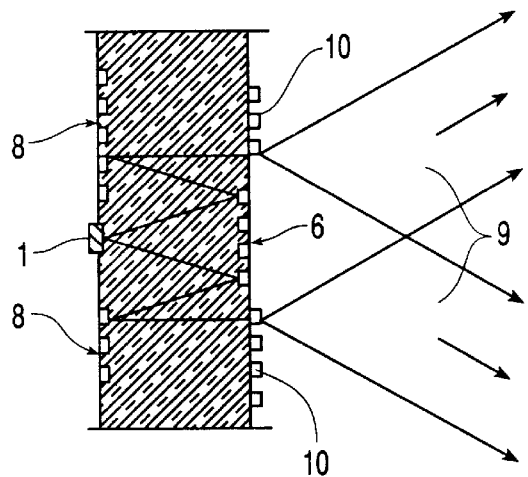
FIG. 26 shows a further embodiment of the invention which is provided with refractive, diffractive or refractive-diffractive hybrid micro lenses on the surface of the plate which is more remote from the source, in order to generate two beams at the output having a predetermined angle therebetween.

In the configuration of FIG. 26, the light beam at the output is split into two separate beams by means of diffractive or diffractive-refractive hybrid projections of the "kino-form" type of the first order or greater.

Figure 27:
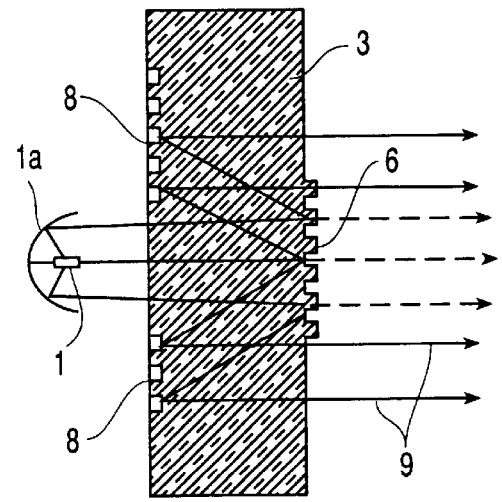
FIG. 27 shows a variant with the source being supported at the outside of the plate and provided with a mirror to reflect a portion of the beam emitted by the source.

In FIG. 27 the micro source 1 is supported at the outside of plate 3 and is provided with a mirror 1a which contributes to address a portion of the radiation towards plate 3. A coating or a diffractive surface located on the face of plate 3 facing towards source 1 may cause a portion of the spectrum to be reflected and the remaining portion to be transmitted so as to reach the integrated micro-telescope.

From the foregoing description it is readily apparent that the invention provides an optical system with a micro-telescope integrated into a thin transparent plate, having the function of expanding and shaping radiation beams emitted by a source, for use in lighting systems outside and inside a motor vehicle, building lighting systems, for safety signals, for road or railway signals, for scientific apparatus, laser processes, test or inspection apparatus, measurement systems such as velocimeters, writing and reading systems for compact disks, passive and active safety systems, radar systems for sensing obstacles.

Naturally, while the principle of the invention remains the same, the details of construction and the embodiments may widely vary with respect to what has been described and illustrated, without departing from the scope of the present invention.

What is claimed is:

1. Micro mirror telescope lighting system, comprising:
   a transparent plate (3), having opposite, first and second major faces,
   a light source (1) arranged immediately adjacent to said second face of the transparent plate (3), or incorporated within the latter, and emitting a beam with a predetermined divergence,
   said plate (3) being provided with first and second reflective surfaces (6,8) on said first and second faces, respectively,
   said light source and said reflective surfaces being arranged with respect to each other so that the light beam emitted by the light source is directed towards the first face, reflected by said first reflective surface towards said second face, and reflected by said second reflective surface towards said first face, the light beam emerging from said first face of the plate as an expanded light beam having different vergence and shape than the light beam emitted by the light source, wherein said first reflective surface (6) is only partially reflective, so that part of the light beam emitted by the light source passes through said plate without being affected, said first face of the plate is formed so that the light beam which has undergone the double reflection on said second and first reflective means (6,8) is not further affected by said first face when passing through said first face after said double reflection, and said transparent plate (3) has a thickness between 2 mm and 15 mm, and a transverse dimension between 2 mm and 50 mm.

2. Micro-telescope lighting system according to claim 1, wherein the light source is a solid state LED or laser.

3. Micro-telescope lighting system according to claim 1, wherein the transparent plate is formed of a plastic or glass material and acts as transparent or coloured radiation guide whose transmittance curve is a function of the spectrum emitted by the source.

4. Micro-telescope lighting system according to claim 1, wherein the light source, with its electrical and electronic components, is integrated into the transparent plate.

5. Micro-telescope lighting system according to claim 1, wherein one of the two reflective surfaces has such a shape as to generate an emitted light beam having a rectangular cross-section.

6. Micro-telescope lighting system according to claim 1, wherein the reflective surface of greater dimension has a predefined geometric cross-section, comprised of a rectangular, hexagonal or star-shaped cross-section, so as to generate a beam having a similar cross-section.

7. Micro-telescope lighting system according to claim 1, including a matrix of micro-telescope lighting devices integrated in a transparent plate so that the outer surface of the plate is totally covered by the cross-sections of the radiation beams.

8. Micro-telescope lighting system according to claim 7, wherein the micro-telescope lighting devices forming said matrix integrated in said transparent plate are different from each other, in order to generate separate light beams.

9. Micro-telescope lighting system according to claim 7, wherein the micro-telescope lighting devices forming said matrix are integrated into said transparent plate, but are separate from each other, so as to provide said plate with some flexibility.

10. Micro-telescope lighting system according to claim 1, wherein it has a symmetrical arrangement with respect to the optical axis.

11. Micro-telescope lighting system according to claim 1, wherein it has an asymmetrical arrangement.

12. Micro-telescope lighting system according to claim 1, wherein said reflective surfaces are obtained by applying a reflective layer on portions of the two opposite faces of said transparent plate.

13. Micro-telescope lighting system according to claim 1, wherein said reflective or semi-reflective surfaces are constituted by portions of the opposite faces of said plate which are formed with micro-projections.

* * * * *